United States Patent
Macher et al.

(10) Patent No.: US 6,717,109 B1
(45) Date of Patent: Apr. 6, 2004

(54) HEATABLE MIRROR, METHOD FOR PRODUCING A HEAT CONDUCTIVE LAYER, AND THE USE THEREOF

(75) Inventors: David Macher, Voitsberg (AT); Heinz Zorn, Eggersdorf (AT); Johann Stark, Graz (AT)

(73) Assignee: Magna Auteca Zweigniederlassung, Weiz (AT)

( * ) Notice: Subject to any disclaimer, the term of this patent is extended or adjusted under 35 U.S.C. 154(b) by 0 days.

(21) Appl. No.: 09/601,692

(22) PCT Filed: Feb. 4, 1999

(86) PCT No.: PCT/EP99/00728
§ 371 (c)(1),
(2), (4) Date: Sep. 22, 2000

(87) PCT Pub. No.: WO99/40039
PCT Pub. Date: Aug. 12, 1999

(30) Foreign Application Priority Data

Feb. 6, 1998 (AU) .......................................... A221 98A1

(51) Int. Cl.⁷ .............................................. H05B 11/00
(52) U.S. Cl. .................. 219/219; 219/543; 219/528; 219/549; 427/446; 427/456; 338/306; 338/308
(58) Field of Search .................. 219/219, 543, 219/549, 522, 528; 427/446, 455, 456; 338/306–314

(56) References Cited

U.S. PATENT DOCUMENTS

| | | | | |
|---|---|---|---|---|
| 4,027,367 A | * | 6/1977 | Rondeau | 428/652 |
| 4,071,736 A | * | 1/1978 | Kamerling | 219/219 |
| 5,294,462 A | * | 3/1994 | Kaiser et al. | 427/446 |
| 5,853,815 A | * | 12/1998 | Muehlberger | 427/446 |

* cited by examiner

*Primary Examiner*—Shawntina Fuqua
(74) *Attorney, Agent, or Firm*—Clark Hill PLC (57) ABSTRACT

A heatable mirror having a transparent surface element made from a substrate of inorganic material and at least one reflective layer as well as at least one heat-conducting layer applied to the substrate and/or the reflective layer and which has contact elements. The heat-conducting layer is formed by conductive particles having an average diameter of 3 to 100 μm at least partially embedded in the surface of the substrate and/or the reflective layer and the heat-conducting layer is designed to be over the entire surface or strip-like, wherein the non-conductive region for the strip-like embodiment is an insulating separating layer between the strips.

23 Claims, 5 Drawing Sheets

HEATABLE MIRROR, METHOD FOR PRODUCING A HEAT CONDUCTIVE LAYER, AND THE USE THEREOF

BACKGROUND OF THE INVENTION

1. Field of Invention

The invention relates to a heatable mirror having a specifically designed heat-conducting layer made from conductive particles, a process for applying heat-conducting layers to substrates and the use of this process for producing heatable mirrors.

2. Description of the Related Art

Heatable mirrors having a heat-conducting layer made from conductive material are known. Hence a heatable mirror is described in U.S. Pat. No. 3,686,437 in which a heat-conducting layer has been applied to a glass substrate under vacuum or by sputtering. This United States patent proposes the use of a nickel-chromium alloy as the heat-conducting layer.

The disadvantage of this mirror is that firstly, the technologies for applying the heat-conducting layer are very complex. As described in the United States patent, application of the nickel-chromium alloy should be carried out either under vacuum or using a sputtering process. Both process steps are too complex and too expensive for mass production. Furthermore, it has been shown that a mirror of this type obviously also does not have adequate heat capacity due to the only very thin layers. This leads to the time span for keeping a mirror free of condensation being too long. Also it is not possible using mirrors of this type to heat certain areas specifically more strongly than others, which is required [is] in many cases because of the construction of the mirror.

SUMMARY OF THE INVENTION

The object of the present invention is therefore to propose a heatable mirror, the heat-conducting layer of which permits high heat capacity and any design of layout for the heat-conducting layer. The object of the invention is also to provide a cost-effective and simple process for mass production by means of which a heat-conducting layer may be applied to a substrate.

[The object is achieved with regard to the heatable mirror by the features of patent claim 1 and with regard to the process by the features of patent claim 17. The sub-claims show advantageous further developments of the solution according to the invention.]

Figure 4:
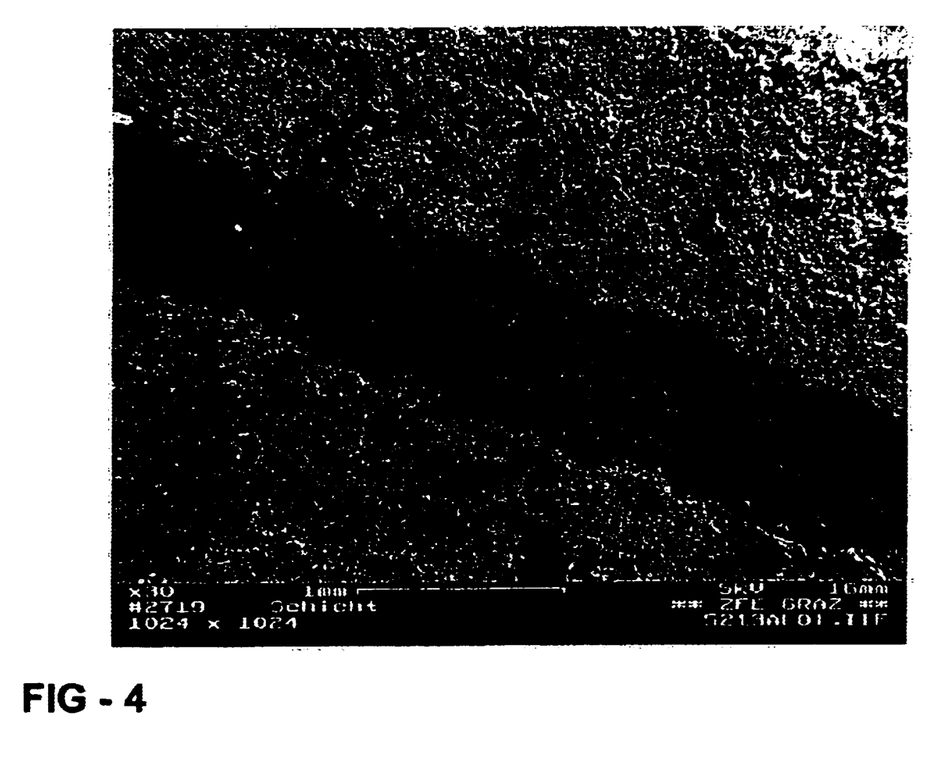
FIG. 4 shows an electron-microscope image in 30 times magnification of a heat-conducting layer of the invention.
Figure 5:
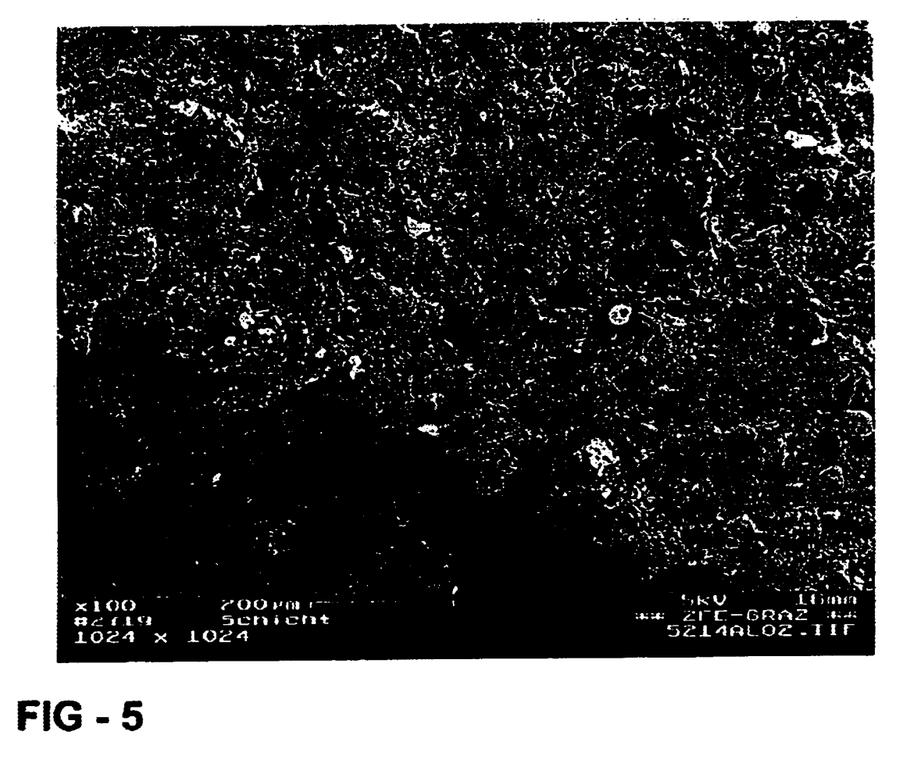
FIG. 5 shows the same heat-conducting layer in 100 times magnification.
Figure 6:
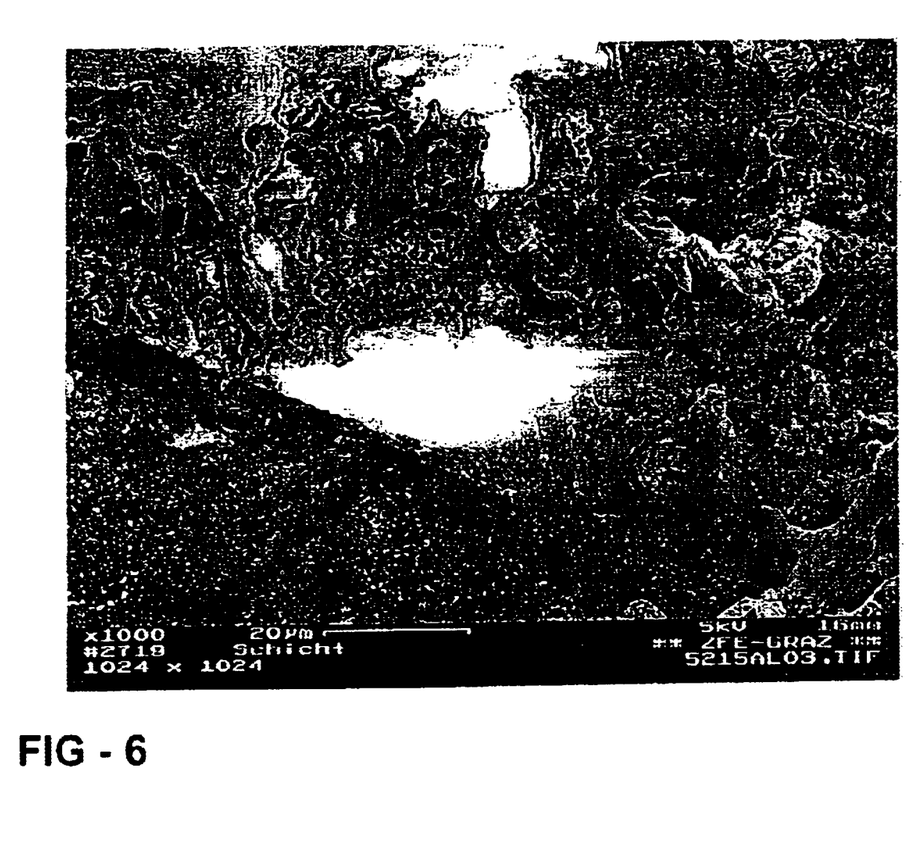
FIG. 6 shows the heat-conducting layer in 1,000 times magnification.

It is thus proposed according to the invention that the heat-conducting layer is formed by conductive particles at least partially embedded in the surface of the substrate and/or the reflective layer. It is thus essential for the heatable mirror of the invention that the particles have an average diameter of 3 to 100 μm. FIGS. 4–6 show scanning electron-microscope images in 30, 100 and 1,000 time magnification, from which particle formation can be seen. Accordingly, the heat-conducting layer has a "rough surface:. FIG. 6 in particular shows that the particles have obviously only been changed insignificantly by the application process. FIGS. 4 to 6 also show that the particles have partially penetrated into the surface of the substrate, here a mirror. Adhesion of the particles to the substrate is thus essentially produced by the penetration of particles into the surface of the substrate. Of course partial sintering of the particles with one another and with the surface also takes place. It is important for the heatable mirror having the heat-conducting layer as described above, that a certain roughness, that is an average particle diameter or 3 to 100 μm is maintained, and that a thus cohering conductive layer is produceD. The heat-conducting layer of the mirror of the invention thus differs from those which are known hitherto from the state of the art, which have been applied conventionally via sputtering processes or evaporation methods. In all these cases a very finely divided homogeneous conducting layer is thus produced which has the disadvantages of the state of the art outlined in the introduction.

The particles themselves are preferably selected from the metals Al, Zn, Sn, Cu, Ni and/or alloys thereof. It is most particularly preferred for the heatable mirror of the invention if the particles consist of aluminum and/or an aluminum alloy having at least 96% aluminum. A further preferred embodiment of the mirror of the invention is characterized in that the substrate for the heatable mirror is glass. The material pairing glass and aluminum and/or aluminum alloy in particular as particles has proved to be particularly superior in its properties with regard to the mechanical adhesion and electrical heat capacity.

For the mirror of the invention, the heat-conducting layer may be designed to be both over the entire surface or strip-like. For the embodiment in which a strip-like heat-conducting layer is present, it is thus important that the regions between the heat-conducting strips consist of an insulating separating layer. This insulating separating layer is preferably a thin film having a width of 0.2 mm to 1 mm. The minimum width is important because otherwise bridging may occur during spraying. The separating layer is produced from a formulation containing resins and solvents. Preferred resins are thus shellac, gum arabic or colophony. The insulating separating layer may thus also contain further additives, as known per se from the state of the art. This separating layer is applied; in the required form by spreading-on, spraying or brushing.

It has also proved to be advantageous if the layer thickness of the heat-conducting layer lies in the range from 10 μm to 100 μm, preferably in the range from 40 to 60 μm. A particular advantage of the heatable mirror of the invention is that the layer thickness of the heat-conducting layer may be selected to be different, so that increased heat capacity is then obtained at particularly critical points in the mirror area, so that condensation is also prevented there. For the case that strip-like heat-conducting layers are used, the strip widths of the heat-conducting layer are 2–20 mm. Also the strip width of the heat-conducting layer may be selected to correspond to the width so that a wider strip width is selected at particularly critical points at which dehumidification of the mirror is only possible with difficulty. Of course the invention also includes all embodiments in which both the layer thickness of the layer and also the strip width is varied.

The heat-conducting layer of the heatable mirror of the invention also shows considerable improvement compared to the state of the art apart from the advantages described above. It has also been shown to the expert in a manner which could not be foreseen, namely that the heat-conducting layer [as defined in patent claim 1] may be provided with a polymer coating which serves as chip protection, for thermal and electrical insulation as well as also as adhesive for fixing the mirror frame.

It was hitherto namely conventional in the state of the art to apply chip protection which was present in the form of adhesive films or foils and which had to be produced in a separate working step and then adhered to the mirror. In the mirror of the invention it is now possible to apply a polymer coating very simply, for example by spraying, particularly because of the surface formed by the particles. It has thus proved to be particularly advantageous if as the polymer coating such a one is selected which consists of a self-curing silane-modified polymer. This now produces the advantage that the mirror is coated over the entire surface with the polymer on the side on which the heat-conducting layer is applied in a single working step, and that simple curing in air then takes place. Silane-modified alkyd resin systems are preferably used as polymers of this type. They are characterized particularly in that they are single-component systems and cross-link in air moisture to give a flexible product. A further advantage of such a coating is that this coating acts as a steam barrier and is UV stable and functions as a sealing material with very good workability.

In the heatable mirror of the invention provision is made, as already known from the state of the art, in that contract points are present for contacting with a voltage source. These contact points are thus preferably designed so that they are connected to the heat-conducting layer via an additional metal layer. This additional metal layer is preferably selected from the metals Zn and/or Sn. This additional metal layer thus has a thickness of 50 to 100 $\mu$m.

The layers known from the state of the art may be used as the reflective layer for the mirror. Examples of these are dichroic layers or chromium or silver layers.

The invention also relates to a process for producing a heat-conducting layer made from electrically conductive particles on a substrate. The process is characterized according to the invention in that the electrically conductive material is supplied to a heat-producing device in wire form and thus exposed to a temperature of >5,000° K. The conductive particles thus produced are conveyed in air onto the substrate surface. It is thus important in the process of the invention that this application process is carried out in ambient atmosphere, that is in room air. Hence this process is simple and cost-effective to construct.

It is preferable in the process of the invention if the heat is produced by means of electric arc. The distance between the device and the substrate is thus preferably 5 to 50 cm, particularly preferably 12 to 25 cm. It should be emphasized in particular for the process of the invention that the particles may be transported using compressed air. As a result of this simple measure it is now possible to also influence the process by varying the pressure. The compressed air may be varied in the range from 2.8 to 7.5 atmospheres.

The process of the invention thus permits the layer thickness of the particles applied to be adjusted by varying the distance of the substrate from the heat-producing device and/or by varying the speed of the particles as well as by the wire feed and the level of the electric arc current.

The process of the invention offers wide-ranging advantages. According to the invention a separating layer should be produced on the substrate as a first process step for the strip-like embodiment. This separating layer is thus designed as regards its structure so that during application the heat-conducting layer obtains the required strip shape, for example meandering or helical.

Surprisingly, it has been shown that such an insulating separating layer may be produced very simply by applying a formulation containing a resin and a solvent. It has been shown that if such an insulating layer is applied to the substrate surface by an application process which is conventional per se, the particles supplied to the substrate by the evaporation method at the points at which the separating layer adheres to the substrate, penetration of the particles into the substrate surface is prevented. The particles landing thus fall off from these regions on which the separating layer is applied and only adhere, that is they penetrate into the surface of the substrate, at the points at which there is no separating layer. FIGS. 4 to 6 now show, by way of example on a glass substrate, an applied aluminum alloy in which a separating layer is also present. FIGS. 4 to 6 illustrate that at the points at which the separating layer has been applied by the subsequent application process, adhesion of the particles has not taken place. In the example of FIGS. 4 to 6, a marker pen having a resin formulation and dyestuffs was used as the separating layer.

This opens wide-ranging possibilities with regard to the layout of the heat-conducting layer to be applied. Using the process of the invention it is thus not only possible to vary the thickness and the strip width, but also the layout of the heat-conducting layer to be applied may be controlled specifically by very simple application of the separating layer on the substrate.

One crucial advantage of the process of the invention is that a polymer coating may be applied over the entire surface of the heat-conducting layer which then serves as chip protection, for thermal and electrical insulation as well as adhesive for fixing the mirror frame. It is obviously possible that a polymer coating may be applied by means of a simple process, for example by rolling, spreading or another conventional application process, particularly due to the rough surface produced by the process of the invention having the particle formation described above. A further advantage is that this polymer coating has excellent adhesion to the base, that is to the conducting layer and/or to the separating layer. A silane-modified plymer, in particular a silane-modified alkyd resin, is preferably used as the polymer coating. The advantage of this system consists in that it is self-curing in air. As a result of this measure very simple and cost-saving application of chip protection is possible which at the same time serves as insulation and optionally as adhesive for the mirror frame.

With regard to the selection of material for the particles to be applied and for the substrates, reference is made to the above statements for the heatable mirror. Accordingly, it is particularly preferable if a material pairing glass and aluminum and/or aluminum alloy is used for the particles. For the insulating separating layer it has thus been proved to be advantageous if a marker pen known per se from the state of the art, for example Eddingmarker®, is used here.

As a result of the excellent control possibilities of the process with regard to layer thickness, strip width and the layout, the process of the invention described in more detail above is particularly suitable for producing heat-conducting layers for heatable mirrors in the motor vehicle industry[, as described in claims 1 to 16].

BRIEF DESCRIPTION OF THE DRAWINGS

[The invention is described in more detail below using FIGS. 1 to 7.] Advantages of the present invention will be readily appreciated as the same becomes better understood by reference to the following detailed description when considered in connection with the accompanying drawings wherein.

DETAILED DESCRIPTION OF THE PREFERRED EMBODIMENT

By way of introduction it should be remembered that the same parts are provided with the same reference symbols or the same component designations in the different embodiments described, wherein the disclosures present in the whole description may be transferred analogously to the same parts with the same reference symbols or the same component designations. Also the positional details, such as for example top, bottom, side etc., selected in the description, relate to the figure actually being described and shown, and should be transferred analogously to the new position for a change of position. Furthermore, individual features or feature combinations from the different exemplary embodiments shown and described in themselves may also be independent, inventive solutions or solutions according to the invention.

Figure 1:
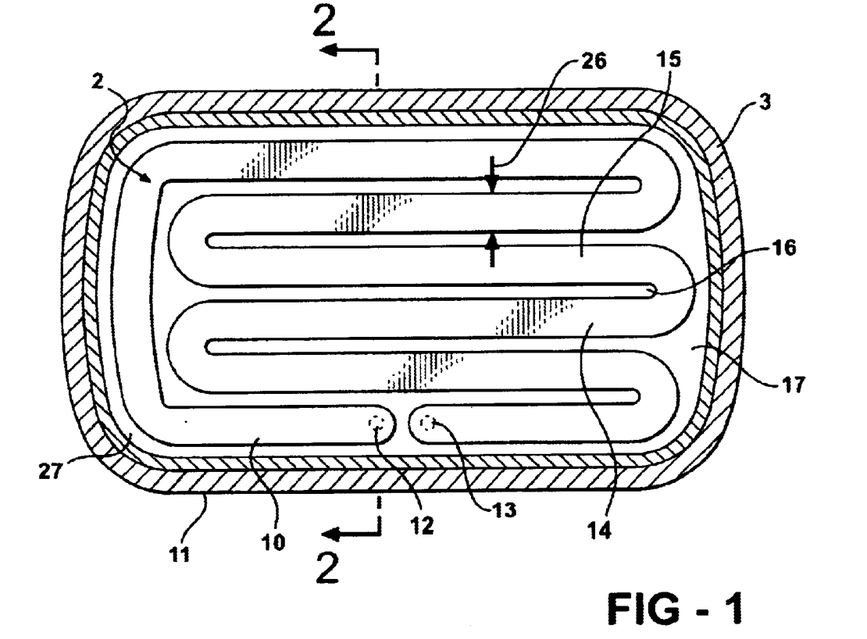
FIG. 1 shows a mirror having a heat-conducting layer designed according to the invention.
Figure 2:
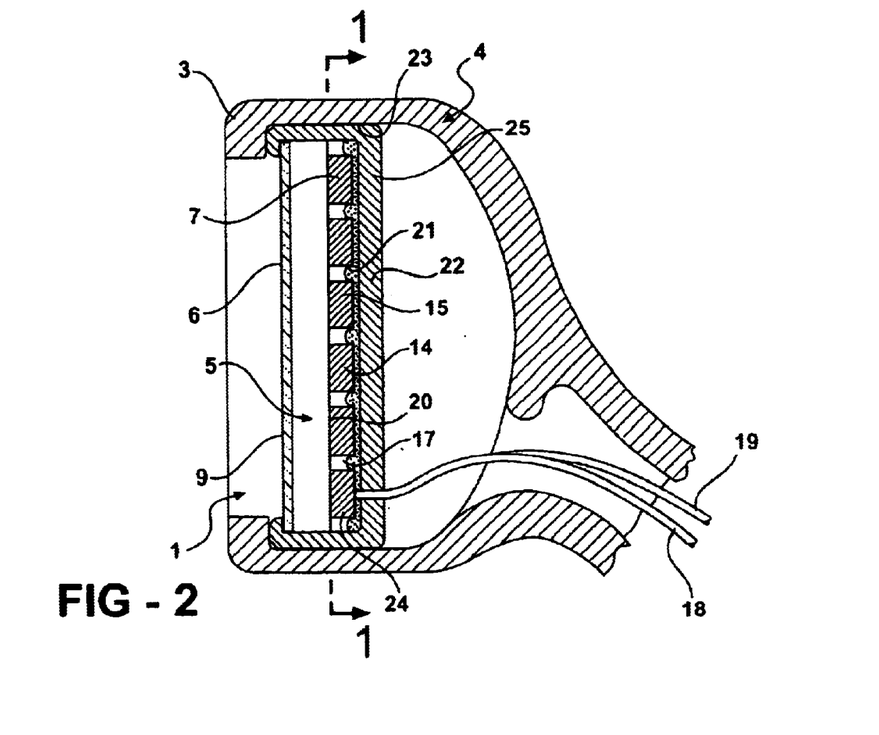
FIG. 2 shows the mirror, sectioned along the lines II—II in FIG. 1.
Figure 3:
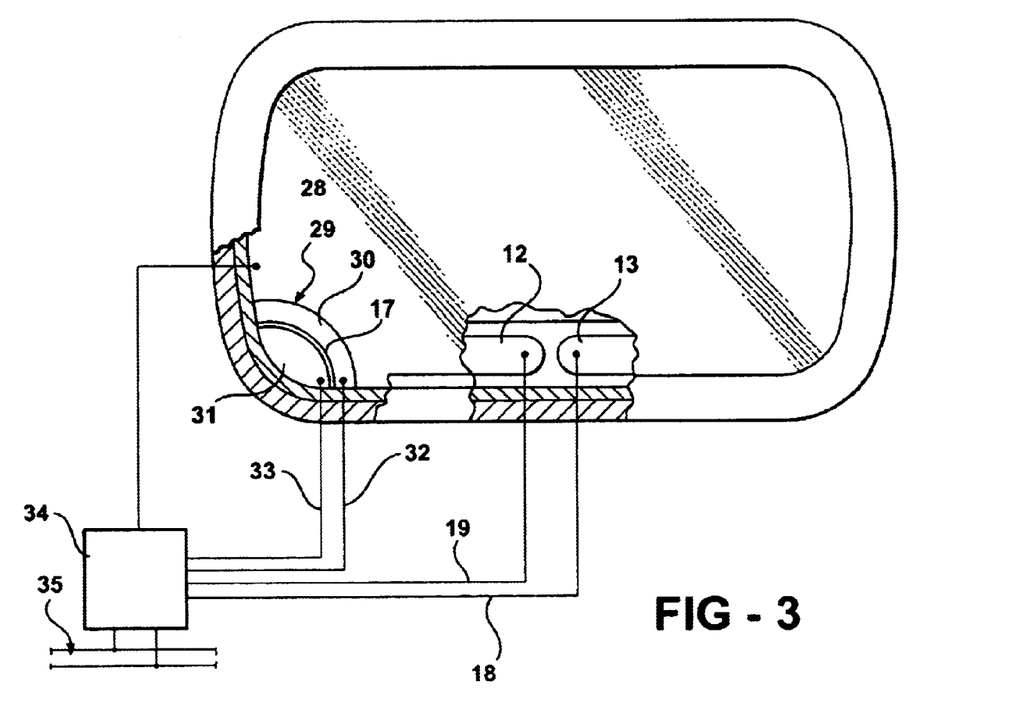
FIG. 3 shows a partial area of the mirror of the invention having a moisture sensor and energy supply and control device shown schematically.

In FIGS. 1 to 3 described together, a heatable mirror 1 having a heating element 2 in a housing 3 is shown for an external mirror 4, for example for motor vehicles. It consists of a substrate 5 made from an inorganic material, for example glass, ceramic, having low thermal conductivity, preferably with ground and coated surfaces 6, 7. The substrate 5 having a reflective layer 9, for example a chromium layer, is coated for example on the surface 7 opposite a viewing direction according to arrow 8.

The heating element 2 having a layer applied at least to one surface 6, 7 of the substrate 5 and/or reflective layer 9 and made from electrically conductive material providing a resistance to the current flow, essentially forms a conducting strip 10, wherein the electrically conductive material is arranged on the surface 6, 7 like a strip or over the entire surface. The strip-like path of the conducting strip 10 is helical or meandering, the surface 7 is preferably designed to cover a large area, wherein an interruption-free path for the conducting strip 10 is provided by an end position situated approximately in the [center] center of a longitudinal end edge 11 up to a further end position arranged immediately adjacent to it. However, it is also possible to design the conducting strip 10 as a full-surface heating layer. Contact elements 12, 13 are arranged in the end positions of the conducting strip 10.

Conducting strip regions 14, 15 running immediately adjacent one another are insulated electrically from one another by means of a separating layer 17 forming a gap 16 between the conducting strip regions 14, 15 and which is arranged on the surface 6, 7 of the substrate 5. The contact elements 12, 13, of which leads 18, 19 are passed through housing 3 for electrical supply of conducting strip 10, are connected to be electrically conductive by direct soldering with the material of the conducting strip 10 and consist of a zinc and/or tin layer applied to the conducting strip 10.

The heating element 2 is provided with a covering layer 21 of electrically non-conductive material on a rear surface 20 facing away from the substrate 5, so that the conducting strip 10 is arranged between substrate 5 and the covering layer 21. The covering layer 21 is thus preferably formed by a self-curing polymer coating, for example of silane-modified polymer. The mirror 1 is adhered into the mirror frame 22 using the covering layer 21 and is held in housing 3 by the support 23.

The conducting strip 10 running between separating layer 17 is formed by particles 24 made from electrically conductive material applied to adhere to the surface 7 by means of electric-arc processes. Particles 24 of Al, Zn, Sn, Cu, Ni and/or alloys thereof are preferably used, wherein the conducting strip 10 for converting current energy to heat energy for supply from a low-voltage mains supply, has a preset resistance value of about 2 $\Omega$ to 20 $\Omega$, preferably 8 $\Omega$. The temperature of the conducting strip 10 exposed to current is thus a maximum 100° C. However, the electrically conductive material or the conducting strip 10 may also be designed to be transparent, for example as a hard glass coating, which is preferably arranged on a front side of the substrate 5 facing the viewing direction—arrow 8, in particular on a front side of the heatable mirror 1 facing a viewing direction—arrow 8.

To achieve different temperature zones distributed over the substrate 5, the heating element 2 is provided with a continuously changing layer thickness 25, with which, for a preset strip width 26 of the lead cross-section and hence the lead resistance opposing the current flow, it is possible to adapt to the requirements for heat capacity in different zones of the mirror 1.

However, even heat voltages between adjacent regions in the substrate 5 are effectively prevented by the design of the heating element 2 of the invention having continuously changing layer thickness 25 of the conducting strip 10, as a result of which it is possible to use very thin-walled substrates 5 without voltage breaks occurring, and reduction of energy use, as well as shorter response times, is subsequently achieved due to the low mass to be heated.

Of course the mirror 1 of the invention may be used not only for the external mirror 4 shown, but also for all external mirrors conventional today, such as for example for electrically adjustable external mirrors.

It is also possible to combine the mirror 1 fitted with the heating element 2 with one or more sensors, for example heat sensors 28 or moisture sensors 29, which may be arranged on the surface 7 or on a surface 6 opposite the conducting strip 10 of a surface element preferably formed by the substrate 5 and optionally the reflective layer 9.

One possible design of the moisture sensor 29 consists, for example in the design of a resistive measuring area, as shown in FIG. 3. The sensor may be formed by a part region of the electrically conductive material arranged to be insulated from the conducting strip 10, in particular from the heating layer. However, electrically conductive contact surfaces 30, 31, for example due to a chromium coating, may also be applied to the surface 6 or 7 in an edge region 27 of the mirror 1 or in the region of a longitudinal end edge 11 of the substrate 5, and which are insulated from one another, for example by the separating layer 17. An electrical voltage is applied to the contact surfaces 30, 31 via leads 32, 33. If moisture forms on the surface 6, as occurs during condensation or freezing, there is current flow due to bridging of the separating layer 17 and the signal derived therefrom may be used as a switch signal to activate the heating element 2 in a corresponding supply and/or control device 34.

We claim:

1. A heatable mirror comprising:
    a transparent surface element made from a substrate (5) of inorganic material;
    at least one reflective layer (9); and
    at least one heat-conducting layer (10) applied to at least a first portion of one of said substrate and said reflective layer and having contact elements (12, 13) connected to said heat-conducting layer (10) by a metal layer;

said heatable mirror characterized by said heat-conducting layer (10) formed by conductive particles having an average diameter of 3–100 µm at least partially embedded in the surface of one of said substrate (5) and reflective layer (9).

2. A heatable mirror according to claim 1 wherein said conductive particles are selected from the metal group of Al, Zn, Sn, Cu, Ni, or alloy thereof.

3. A heatable mirror according to claim 1 wherein said conductive particles are an aluminum alloy having at least 96 percent aluminum.

4. A heatable mirror according to claim 2 wherein said substrate (5) is glass.

5. A heatable mirror according to claim 4 wherein the thickness of said heat-conducting layer (10) is in the range of 10–100 µm.

6. A heatable mirror according to claim 1 wherein said metal layer defining said contact elements is selected from the group of Zn, Sn, or Ag.

7. A heatable mirror according to claim 1 wherein said heat-conducting layer (10) is helical in shape.

8. A heatable mirror according to claim 7 wherein a width of said heat-conducting layer (10) is in the range of 2–20 mm.

9. A heatable mirror according to claim 1 further including a moisture sensor (28) and a heat sensor (29) connected between a control device (34) and said heat-conducting layer (10).

10. A heatable mirror according to claim 1 wherein the at least one heat-conducting layer (10) is arranged as spaced apart strips over the first portion of the surface of one of said substrate (5) and reflective layer (9) defining a second portion of non-conductive regions of an insulating separating layer (17) therebetween.

11. A heatable mirror according to claim 1 further comprising a polymer coating applied to the entire surface of said heat-conducting layer (10) defining a covering layer (21) for providing chip protection and insulation.

12. A heatable mirror according to claim 10 wherein said insulating separating layer (17) is a film formed from resin, solvent and additives.

13. A heatable mirror according to claim 12 wherein said resin is a natural resin from one of shellac, gum arabic and colophony.

14. A heatable mirror according to claim 13 wherein said additives are dyestuffs.

15. A heatable mirror according to claim 11 wherein said polymer coating is a silane-modified polymer which cures in air.

16. A process for making a heatable mirror comprising the steps of:
  (a) supplying a transparent surface element made from a substrate of inorganic material;
  (b) supplying at least one reflective layer;
  producing a heat-conducting layer made from electrically conductive particles on at least a first portion of one of the substrate and the reflective layer, the particles being at least partially embedded in a surface of one of the substrate and the reflective layer, step (c) comprising supplying the electrically conductive material to a heat-producing device in wire form,
  heating the electrically conductive material to a temperature greater than 5000° K, and
  conveying the particles produced in air onto the first portion of one of the substrate and the reflective layer.

17. A process according to claim 16 further including heating the electrically conductive material by an electric arc at a distance from the substrate in the range of 5–50 cm.

18. A process according to claim 17 wherein the particles are transported by compressed air in the range of 2.8–7.5 atmospheres.

19. A process according to claim 18 wherein a thickness of the layer of particles is adjusted by varying one of the distance of the substrate from the heat-producing device, varying the compressed air for the particles and varying a feed rate of the wire to the heat-producing device.

20. A process according to claim 16 further comprising the step of applying an insulating separating layer to at least a second portion of one of the substrate and the reflective layer before applying the heat-conducting layer for preventing penetration of the particles landing on the second portion.

21. A process according to claim 20 including applying the insulating separating layer in a strip for forming a helical heat-conducting layer.

22. A process according to claim 16 including applying a polymer coating for forming a covering layer over the entire surface of the heat-conducting layer as chip protection and insulation.

23. A process according to claim 22 wherein said polymer coating is rolled-on as a self-curing silane-modified polymer.

* * * * *

UNITED STATES PATENT AND TRADEMARK OFFICE
CERTIFICATE OF CORRECTION

PATENT NO. : 6,717,109 B1
DATED : April 6, 2004
INVENTOR(S) : Macher et al.

It is certified that error appears in the above-identified patent and that said Letters Patent is hereby corrected as shown below:

Column 7,
Line 34, insert -- said -- before "reflective".

Column 8,
Line 9, insert tab and -- (c) -- before "producing"
Line 13, insert -- : -- after "comprising".
Line 29, delete both occurrences of "varying"

Signed and Sealed this

Eighth Day of June, 2004

JON W. DUDAS
*Acting Director of the United States Patent and Trademark Office*